United States Patent [19]

Koike et al.

[11] Patent Number: 4,979,727
[45] Date of Patent: Dec. 25, 1990

[54] AUTOMATIC DOCUMENT FEEDER PROVIDED WITH THREE MOVABLE CLAWS FOR DIRECTING THE PAPER THROUGH DIFFERENT PATHS

[75] Inventors: Tadao Koike, Tokyo; Kohichi Tsunoda, Yokohama, both of Japan

[73] Assignee: Ricoh Company, Ltd., Tokyo, Japan

[21] Appl. No.: 413,586

[22] Filed: Sep. 28, 1989

[30] Foreign Application Priority Data

Sep. 30, 1988 [JP] Japan ................. 63-246872

[51] Int. Cl.$^5$ ............. B65H 5/22; B65H 29/00; B65H 39/10; G03G 21/00
[52] U.S. Cl. ................. 271/3.1; 271/186; 271/303; 355/318; 355/320; 355/321
[58] Field of Search ............ 355/318, 319, 320, 321; 271/303, 186, 185, 902, 3, 3.1

[56] References Cited

U.S. PATENT DOCUMENTS

| | | | |
|---|---|---|---|
| 4,176,945 | 12/1979 | Holzhauser et al. | 271/186 X |
| 4,231,561 | 11/1980 | Kaneko et al. | 355/23 X |
| 4,264,067 | 4/1981 | Adams et al. | 271/902 X |
| 4,272,180 | 6/1981 | Satomi et al. | 355/319 X |
| 4,319,833 | 3/1982 | Hidding | 271/3.1 |
| 4,412,740 | 11/1983 | Buddendeck et al. | 271/3.1 X |
| 4,544,148 | 10/1985 | Kitajima et al. | 271/902 X |
| 4,639,125 | 1/1987 | Okuda et al. | 271/186 X |
| 4,650,313 | 3/1987 | Koike | 355/23 |
| 4,667,951 | 5/1987 | Houjo | 271/902 X |
| 4,699,365 | 10/1987 | Smith et al. | 271/303 X |
| 4,714,241 | 12/1987 | Randall | 271/3.1 |
| 4,744,553 | 5/1988 | Hirose | 271/186 X |
| 4,744,553 | 5/1988 | Hirose | 355/23 X |
| 4,761,001 | 8/1988 | Hayakawa et al. | 271/902 X |
| 4,817,933 | 4/1989 | Houjo et al. | 271/902 X |
| 4,831,411 | 5/1989 | Sugishima | 355/319 |
| 4,851,883 | 7/1989 | Ito | 355/203 X |

FOREIGN PATENT DOCUMENTS

| | | | |
|---|---|---|---|
| 0196427 | 8/1988 | Japan | 271/186 |
| 0081654 | 4/1987 | Japan | 355/319 |
| 0021666 | 1/1987 | Japan | 271/186 |
| 0196426 | 8/1988 | Japan | 186/ |
| 0041336 | 2/1988 | Japan | 271/186 |
| 0132251 | 8/1983 | Japan | 355/23 |

Primary Examiner—R. L. Moses
Assistant Examiner—Nestor R. Ramirez
Attorney, Agent, or Firm—Oblon, Spivak, McClelland, Maier & Neustadt

[57] ABSTRACT

An automatic document feeder for an image forming apparatus comprises first and second document trays each for stacking thereon one or more documents. A document feeding unit is provided for feeding the documents one by one from the first document tray in order from the uppermost one of the documents, while reversing the same upside down. A reversing convey unit is provided for receiving the document fed from the optical exposure portion and for feeding the same in a first direction toward the second document tray while reversing the same upside down, as well as a second direction opposite to the first direction. A first change-over member is provided for selectively connecting the optical exposure portion to the document feeding unit or the reversing convey unit. A second change-over member is movable between a first position for leading the document fed from the optical exposure portion toward the reversing convey unit, and a second position for leading the document toward the second document tray when the document is fed by the reversing convey unit in the second direction. A third change-over member is provided for selectively leading the document fed by the reversing convey unit in the first direction to the second document tray or the optical exposure portion.

6 Claims, 6 Drawing Sheets

AUTOMATIC DOCUMENT FEEDER PROVIDED WITH THREE MOVABLE CLAWS FOR DIRECTING THE PAPER THROUGH DIFFERENT PATHS

BACKGROUND OF THE INVENTION

The present invention relates to an automatic document feeder for an image forming apparatus such as copying apparatus. More particularly, the invention relates to an automatic document feeder for feeding a plurality of stacked documents one by one on to an optical exposure portion of the image forming apparatus.

Japanese Patent Laying Open Numbers. (KOKAI). 58-80667 discloses a conventional automatic document feeder for feeding a plurality of stacked documents one by one on to an optical exposure portion of a copying apparatus, in which a plurality of stacked documents are fed from the document tray one by one in order from the lowermost one thereof. Japanese Patent Laying Open Numbers (KOKAI). 61-166438, and 61-172165 disclose automatic document feeders, respectively, which are similar to that in the first reference.

Each of the above-mentioned conventional document feeders can feed not only single-sided image bearing documents, but also two-sided image bearing documents. However, in these conventional document feeders, since the documents are fed from the document tray in order from the lowermost one thereof, as mentioned above, they suffer from a disadvantage in that after being subjected to an optical exposure process, the documents having successive pages will be inconveniently stacked on the discharge tray in the state that the order of pages of the documents is opposite to that on the document tray.

On the other hand, in these conventional document feeders, the documents having successive pages are stacked on the document tray in the state that the image bearing surfaces of the documents are oriented upward, and that the uppermost document has a first page, while the lowermost document has a last page. In this case, when the image bearing pages of an odd number of single-sided image bearing documents are to be copied on opposite sides of transfer papers for producing two-sided copy papers, the conventional document feeders suffer from a disadvantage in that a blank page would be formed on the back side of a first page copied. In order to eliminate such a disadvantage, it is necessary to count the number of single-sided image bearing documents before a copying process is started.

Further, the document feeder of the above-mentioned type requires a relatively large and complicated document conveying path, particularly in a reversing circulation path.

SUMMARY OF THE INVENTION

It is therefore an object of the present invention to provide an automatic document feeder which makes it possible to produce single-sided copies and two-sided copies without any inconvenience, with a simple and smaller construction, irrespective of the number of documents and the use of single-sided or two-sided documents.

The object of the invention can be achieved by an automatic document feeder for an image forming apparatus having an optical exposure portion for performing thereon scanning of a document, comprising:

first and second document trays each for stacking thereon one or more documents;

a document feeding means for feeding the documents one by one from the first document tray in order from the uppermost one of the documents, while reversing the same upside down;

A document conveying means for feeding a document in forward or backward directions along the optical exposure portion;

a reversing convey means for receiving the document fed from the optical exposure portion and for feeding the same in a first direction toward the second document tray while reversing the same upside down, as well as a second direction opposite to the first direction;

a first change-over means for selectively connecting the optical exposure portion to the document feeding means or the reversing convey means;

a second change-over means movable between a first position at which the document fed from the optical exposure portion is led toward the reversing convey means, and a second position at which the document is led toward the second document tray when the document is fed by the reversing convey means in the second direction; and a third change-over means for selectively leading the document fed by the reversing convey means in the first direction to the second document tray or the optical exposure portion;

when a two-sided image bearing document is copied, the first change-over means being adapted to connect the optical exposure portion to the reversing convey means, and the third change-over means being adapted to lead the document to the optical exposure portion while the reversing convey means is adapted to feed the document in the first direction, after that, the first change-over means being adapted to be maintained in the selecting position thereof, and the third change-over means adapted to lead the document to the second document tray while the reversing conveying means being adapted to be maintained in the feed direction of the document;

when a single-sided image bearing document is copied, the first change-over means being adapted to connect the optical exposure portion to the reversing convey means, and the third change-over means being adapted to lead the document to the second document tray while the reversing convey means is adapted to feed the document in the first direction, after that, the second change-over means being adapted to move to the second position and the third change-over means being adapted to be maintained in the selecting position thereof while the reversing convey means is adapted to be changed in the feeding direction to the second direction.

In the automatic document feeder having the above-mentioned construction, when a plurality of single-sided image bearing documents are used, the documents are stacked on the first document tray in the state that the image bearing surfaces thereof are oriented upward, and that the uppermost document has the first page. The documents are fed from the first document tray one by one in order from the uppermost document, i.e., the first page, in the state that the image bearing surface of each document is reversed upside down. After the optical exposure process has been performed, each document is twice reversed upside down by the reversing convey means and then discharged onto the second document tray in the state that the image bearing surface thereof oriented downward. Accordingly, when the documents are turned over all together after they have been taken out from the second document tray, the order of pages of the documents becomes equal to that of the documents set on the first document tray.

On the other hand, when the two-sided image bearing documents having successive pages are used, the documents are also stacked on the first document tray in the state that the first or front surfaces of the documents are oriented upward, and that the uppermost document has the first gage at its first or front surface. The documents are fed from the first document tray one by one in order of from the uppermost document, i.e., the first page, in the same manner as that for the single-sided document. After the first or front surface of the document has been subjected to an optical exposure process, the document is reversed upside down through the reversing convey means and then returned to the optical exposure portion. After the second or back surface of the document has been subjected to an optical exposure process, the document is fed through the reversing convey means while being reversed upside down again, and then discharged onto the second document tray in the state that the first or front surface thereof is oriented downward. Accordingly, also in case of the two-sided documents, it is possible to take out the documents in the state that the order of pages of the documents is equal to that of the documents set on the first document tray.

Further, in the automatic document feeder according to the present invention, even when image bearing pages of an odd number of single-sided image bearing documents are copied on opposite sides of transfer papers for producing two-sided copy papers, it is ensured that a blank page is conveniently formed on the back side of a transfer paper which in turn is copied on the front side thereof with the last page of the documents. Accordingly, it is possible to prevent such a blank page from being formed on the back side of a first page copied, and it is unnecessary to count the number of single-sided image bearing documents before a copying process is started.

Accordingly, the present invention can provide an automatic document feeder which makes it possible to produce single-sided copies and two-sided copies without any inconvenience, with a simple and smaller construction, irrespective of the number of documents and the use of single-sided or two-sided documents.

Preferably, the document feeding means, the reversing convey means, and the first, second and third change-over means are disposed at one side of the optical exposure portion. According to this construction, it is possible to reduce the time necessary for setting the document on the optical exposure portion of the copying apparatus. Further, when the automatic document feeder is pivotally attached to a image forming apparatus main body at the side of the optical exposure portion, it is possible to reduce force necessary for the pivotal movement of the automatic document feeder.

Further objects, features and advantages of the present invention will become apparent from the following description of the preferred embodiments of the present invention as illustrated in the accompanying drawings.

DESCRIPTION OF THE PREFERRED EMBODIMENTS

Figure 1:
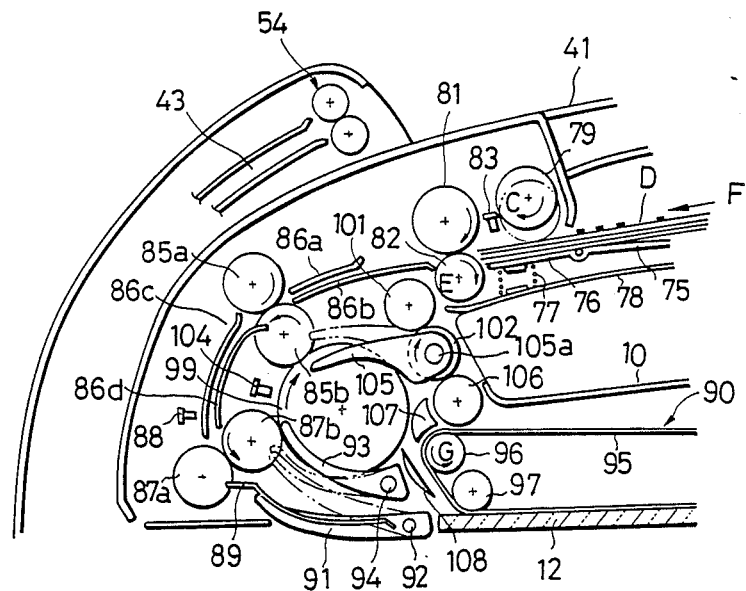
FIG. 1 is a schematic constitutional view of a main part of an automatic document feeder (ADF) according to one embodiment of the present invention.
Figure 2:
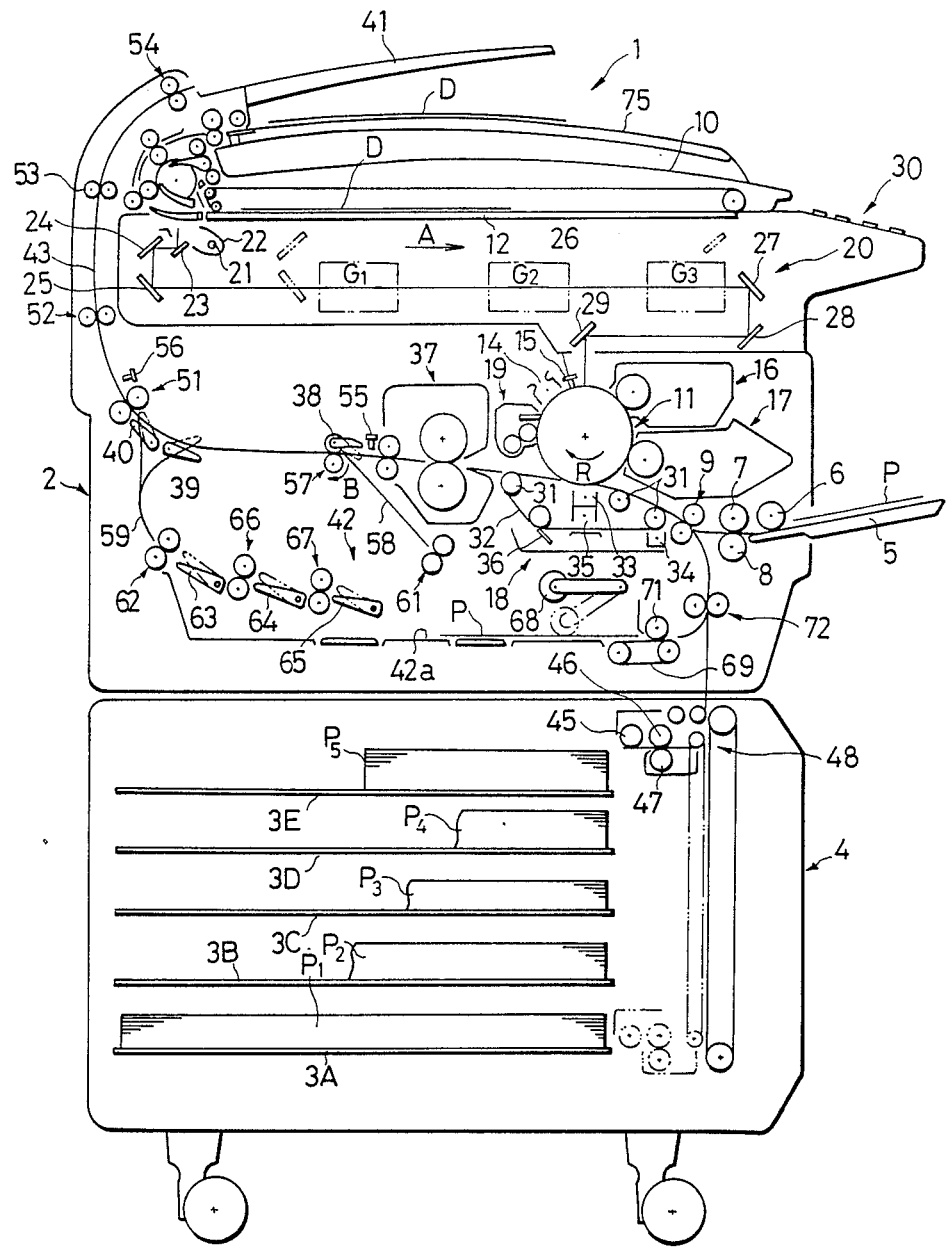
FIG. 2 is a schematic constitutional view of the whole construction of a copying apparatus including the automatic document feeder shown in FIG. 1.

FIG. 1 schematically shows a main part of an automatic document feeder (ADF) according to one embodiment of the present invention, and FIG. 2 schematically shows the whole construction of a copying apparatus including the automatic document feeder shown in FIG. 1.

Referring first to FIG. 2, the automatic document feeder 1 for automatically feeding originals or documents is mounted on the upper surface of a copying apparatus main body 2 for performing an image-forming process, which in turn is mounted on the upper surface of a multi-stage paper feed unit 4. Vertically arranged in the main body 2 are five paper feed trays 3A to 3E for stacking thereon a plurality of transfer papers P1 to P5, respectively.

Attached to one side (the right side in FIG. 2) of the main body 2 is a multiple manual paper feeder 5 which is pivotally movable from its closed state to its open state for enabling a manual insertion of transfer papers P. At the upper left of the manual paper feeder 5, there is provided a paper pick-up roller 6 for picking up the transfer papers P one by one from the manual paper feeder 5 to a paper conveying path defined within the main body 2. The paper conveying path extends through the outer peripheral surface of a cylindrical photosensitive drum 11 which is controlled to rotate in the direction of the arrow R shown in FIG. 2.

Disposed on the paper conveying path in the down stream side of the pick-up roller 6 are a paper feed roller 7 and a separation roller 8 which are pressed on each other in the vertical direction. Disposed on the paper conveying path in the downstream side of the rollers 7 and 8 are a pair of register rollers 9. The transfer paper P fed from the manual paper feeder 5 can be brought into contact with a toner image on the outer peripheral surface of the drum 11 with accurate timing by means of the register rollers 9.

Secured on the upper surface of the copying apparatus main body 2 is a transparent contact glass 12 for carrying thereon a original or document D to be copied.

Disposed beneath the contact glass 12 within the main body 2 is an optical exposure system 20 for enabling the document D positioned in place on the contact glass 12 to be scanned in the direction of the arrow A shown in FIG. 2.

The optical exposure system 20 comprises a light source 21 for emitting light for illuminating the document D positioned on the contact glass 12, a reflector 22, movable mirrors 23 to 25, a zoom lens 26, and stationary mirrors 27 to 29. The light source 21, the reflector 22, and the movable mirror 23 together constitute a first scanner, while the movable mirrors 24 and 25 together constitute a second scanner. The first and second scanners can be driven by a drive motor (not shown) in such a manner that the first scanner moves in the direction of the arrow A shown in FIG. 2 at a speed V/m with respect to a constant peripheral speed V of the drum 11, as the second scanner moves in the same direction at a speed V/2 m, in which "m" represents a copy magnification ratio.

The peripheral speed V is maintained at a constant value irrespective of the state of copy mode such as equi-magnification copy mode, or reduced or enlarged magnification copy mode. Moving the position of the zoom lens 26 along the optical axis thereof causes the copy magnification ratio m to change. In the particular embodiment of the invention, as shown in FIG. 2, when the zoom lens 26 is placed at positions G1, G2, and G3, the copy magnification ratio m is obtained as m=0.5 (reduced magnification of 200%), m=1.0 (equi-magnification), and M=2.0 (enlarged magnification of 50%), respectively.

As the photosensitive drum 11 is rotated in the direction of the arrow A, the whole of the outer peripheral surface thereof is uniformly charged by means of an electric charger 14, and then, unnecessary electric charges in a part of the drum surface is erased by means of an eraser 15. After that, an electrostatic latent image is formed on the drum surface through the optical exposure system 20, and then, the latent image is converted to a visible toner image by means of first and second developing devices 16 and 17 each of which acts to adhere toner powder to the latent image on the drum surface through a magnetic blush. The toner image on the drum surface is then transferred to the surface of the transfer paper P by means of a belt transfer device 18. A cleaning device 19 is provided for cleaning the remaining toner on the drum surface.

The belt transfer device 18 comprises an endless belt 32 which is supported by four rollers 31 so as to be brought into press contact at its upper portion with the drum surface with an adequate force. An electric charger 33 is disposed inside of the belt 31 and is constructed to generate corona discharge for the transfer of toner from the drum surface to the transfer paper P between the drum 11 and the upper portion of the belt 32. Another charger 34 is provided for charging the belt 32 and thereby for causing the transfer paper P fed from the rollers 9 to be electrostatically absorbed on the outer surface of the upper portion of the belt 32. Reference numeral 35 designates a charge elimination device for eliminating electric charges on the belt 32, and reference numeral 36 designates a rubber blade for cleaning the residual substance on the outer surface of the belt 32.

A fixing device 37 is disposed on the paper conveying path at the downstream side of the drum 11, seen in the conveying direction of the transfer paper P. Disposed on the paper conveying path at the downstream side of the fixing device 37 are a gate claw 38 and a conveyor roller 57 which is rotatable in forward and backward directions. The gate claw 38 is adapted to be moved from its first position as denoted by the solid line shown in FIG. 2 to its second position as denoted by the imaginary line when a small-sized transfer paper such as a transversely postured transfer paper of A4-size (or LT-size) or a paper smaller than the same is to be subjected to a two-sided copy paper producing treatment. Disposed on the paper conveying path at the downstream side of the claw 38 is a synthetic gate claw 39 which is adapted to be moved from its first position as denoted by the solid line to its second position denoted by the imaginary line when a transfer paper is to be copied with a synthetic or superimposed copy mode.

Another gate claw 40 is disposed on the paper conveying path at the downstream side of the claw 39. The claw 40 is adapted to be moved from its first position as denoted by the solid line to its second position as denoted by the imaginary line when a large-sized transfer paper such as a longitudinally postured transfer paper of A4-size or B5-size is to be subjected to a two-sided copy paper producing treatment.

The automatic document feeder 1 comprises an uppermost paper discharge tray 41, and the paper conveying path is constructed to lead to the tray 41. Disposed on the paper conveying path between the claw 40 and the tray 41 are a reverse roller 51 which is rotatable in forward and backward directions, and a plurality of pairs of conveyer rollers 52, 53 and 54 which are also rotatable in forward and backward directions. A sensor 55 is disposed closely before the gate claw 38, seen in the paper conveying direction, and another sensor 56 is disposed closely after the reverse roller 51.

When copy is to be performed with a synthetic or superimposed copy mode or a two-sided copy paper producing mode, a transfer paper P is fed from the paper conveying path to a paper resupply device 42 having an intermediate paper tray 42a which is disposed in the interior of the lower portion of the copying apparatus main body 2. After that, the paper P is fed from the paper resupply device 42 to the paper conveying path through the register rollers 9. The paper P is then subjected to an image transferring operation and a image fixing operation again, in the same manner as that described above.

The paper resupply device 42 comprises first and second paper feeding-in paths 58 and 59 for introducing a transfer paper P from the paper conveying path to the paper resupply device 42. The first paper feeding-in path 58 is connected at its upstream end to the paper conveying path through the gate claw 38 and is provided at its down stream end with a pair of release rollers 61 for releasing a transfer paper P from the path 58 to the intermediate paper tray 42a of the paper resupply device.

On the other hand, the second paper feeding-in path 59 is connected at its branched two upstream ends to the paper conveying path through the respective gate claws 39 and 40 and is provided at its downstream end with a pair of paper release rollers 62. Disposed at the downstream side of the release rollers 62 are a plurality of spaced gate claws 63, 64, and 65, each of which defines a gate outlet for allowing a transfer paper to be discharged therethrough onto the tray 42a. Each of the gate claws 63, 64, and 65 is capable of being selectively moved to open and close the corresponding gate outlet in accordance with the size of a transfer paper such as, for example, a transfer paper of A3-size or B4-size and a longitudinally postured paper of A4-size. Additional paper release rollers 66 and 67 are each disposed between successive two gate claws (63 and 64; 64 and 65).

Disposed above the intermediate paper tray 42a at the downstream side of the claw 65 is an alignment roll 68 for aligning the leading edges of the transfer papers P on the tray 42a. The alignment roll 68 is movable between two positions as denoted by the solid and imaginary lines in FIG. 2. Disposed at the right side (downstream side) of the alignment roll 68 are a paper feed belt 69 and a separation roller 71. The paper feed belt 69 is adapted to feed a transfer paper P while capturing thereon the transfer paper P by utilizing a suction force which is generated by a suction fan (not shown) and acts to the transfer paper P through a plurality of through holes (not shown) formed in the belt 69. The separation roller 71 is urged to be in press contact with the belt 69 at a certain force adequate to enable the separation of the transfer paper P from the belt 69. Disposed at the downstream side of the belt 69 and the roller 71 are a pair of conveyer rollers 72 for feeding a transfer paper to the register rollers 9.

On the other hand, the multi-stage paper feed unit 4 comprises a movable paper feed device 48 which, in turn, comprises a paper pick-up roller 45, a paper feed roller 46 and a separation roller 47. The paper feed roller 46 and the separation roller 47 are pushed to each other in the vertical direction. The movable paper feed device 48 can be moved by means of an elevator (not shown) in the vertical direction along the right side of each of the paper feed trays 3A to 3E and then stopped at its different working positions which correspond to the vertical positions of the paper feed trays 3A to 3E, respectively. The operation of the movable paper feed device 48 is such that when one of different paper sizes corresponding to the transfer papers P1 to P5 stacked on the trays 3A to 3E, respectively, is selected through an operation panel 30 provided on the upper surface of the copying apparatus main body 2, the movable paper feed device 48 can be moved to one of its working positions, which corresponds to a selected paper size.

Accordingly, in this embodiment, a paper feed operation can be performed by either of the two methods which utilize the manual paper feeder 5 and the multi-stage paper feed unit 4, respectively.

Namely, in the case of the method using the manual paper feeder 5, the feeder 5 is changed manually to its open state, as shown in FIG. 2, so that a single or a suitable number of transfer papers P can be put on the feeder 5. Pushing the transfer paper(s) P into the copying apparatus main body 2 along the feeder 5 causes the paper pick-up roller 6 to come down onto the upper surface of the transfer paper P located on the feeder 5. Pushing a copy start button (not shown) disposed on the upper surface of the main body 2 causes the paper pick-up roller 6 to rotate in the clockwise direction in FIG. 2, causing the transfer paper P to be fed from the feeder 5 to a path between the paper feed roller 7 and the separation roller 8.

When two or more overlapping transfers papers P have been simultaneously fed from the feeder 5, the separation roller 8 serves to separate an uppermost paper P from the remaining paper(s) P, so that only the uppermost paper P can be fed to a path between the register rollers 9. The register rollers 9 can temporarily interrupt a forward motion of the transfer paper P for performing rectification of a possible skew of the transfer paper 9. Thereafter, the transfer paper P is fed through the register rollers 9 again while being synchronized with the drum 11 with an accurate timing for ensuring the conformity of the transfer paper P with a toner image formed on the photosensitive drum 11. The toner image formed on the drum surface is transferred to the transfer paper P between the drum 11 and the belt 32 by the charging action of the charger 33 and then fixed thereon by the fixing device 37.

On the other hand, in the case of the method using the multi-stage paper feed unit 4, when the copy start button is made ON in the state that one of the different paper sizes corresponding to those of the transfer papers P1 to P5 stacked on the respective trays 3A to 3E is selected, the movable paper feed device 48 is actuated to move vertically to a selected working position thereof, which corresponds to a selected paper size, as mentioned above. When the movable paper feed device 48 is stopped at the working position, the corresponding paper feed tray is moved horizontally to approach the movable paper feed device 48.

Thereafter, the paper pick-up roller 45 of the device 48 is brought into press contact with the upper surface of an uppermost transfer paper on the corresponding tray with the rotation in the counterclockwise direction in FIG. 2. In this way, a selected one of the transfer papers P1 to P5 is fed from the corresponding tray to a path between the paper feed roller 46 and the separation roller 47, and further, to the register rollers 9 through the conveyer rollers 72 in the copying machine main body 2.

After that, the transfer paper (P1 to P5) is fed to a path between the photosensitive drum 11 and the belt 32 for subjecting to the transfer of a toner image from the drum surface in the same manner as that for the transfer paper P fed from the manual paper feeder 5.

After the toner image transferred onto the transfer paper has been fixed by means of the fixing device 37, the transfer paper is conveyed to one of the succeeding processing portions, which can be selected in accordance with a previously designated one of various copy modes.

Namely, in the case of a single-side copy mode, after the transfer paper (P1 to P5) has passed through the fixing device 37, the paper is fed to the conveyer path 43 through the gate claws 38, 39, and 49 in the state that these claws are located at their first positions as denoted by the solid lines in FIG. 2, respectively. Thereafter, the transfer paper (P1 to P5) is discharged from the conveyer roller 54 to the paper discharge tray 41 in the state that the image-carrying surface thereof is oriented downward.

On the other hand, in the case of a two-sided copy paper producing mode, the transfer paper can be selectively led to either of the two paper feeding-in paths 58 and 59 in accordance with the size of the transfer paper, after the transfer paper has been passed through the fixing device 37.

Namely, when the transfer paper to be subjected to the two-sided copy paper producing process is a small-size paper such as a transversely postured transfer paper of A4-size or a paper smaller than the same, the paper feeding-in path 58 is used first, after one side, i.e., a first side, of the transfer paper has been copied. In this case, the transfer paper is detected by a sensor 55 which is disposed at the outlet side of the fixing device 37, and after the trailing edge of the transfer paper has passed over the claw 38, the gate claw 38 is moved from its first position as denoted by the solid line to its second position as denoted by the imaginary line in FIG. 2, and the conveyer roller 57 is changed to rotate in the direction of the arrow B, on the basis of the detection of the transfer paper by means of the sensor 55. Accordingly, the transfer paper is fed to the first paper feeding-in path 58 and then discharged therefrom onto the intermediate paper tray 42a of the paper resupply device 42 through the release rollers 61.

After that, the alignment roll 68 causes the transfer paper on the tray 42a to move toward the right side of the tray 42a for the alignment of the leading edge of the transfer paper. In this way, after all the transfer papers have been stacked on the tray 42a, the transfer papers are fed therefrom one by one to the conveyer rollers 72 through a path between the paper feed belt 69 and the separation roller 71. Otherwise, whenever stacking on the tray 42a, one transfer paper may be fed therefrom to the conveyer rollers 72.

Further, the transfer paper is fed to the path between the photosensitive drum 11 and the belt 32 through the register rollers 9 in the state that the first side of the transfer paper is oriented downward. Namely, as the transfer paper is forwarded between the drum 11 and the belt 32, a new toner image formed on the drum surface is now transferred to a second side (i.e., the upper side) of the transfer paper. The new toner image on the second side of the transfer paper is then fixed by means of the fixing device 37.

In this case, when the copying apparatus is set to a mode for producing a single two-sided copy paper, the transfer paper which has passed through the fixing device 37 is fed to the conveyer path 43 through the claws 38, 39 and 40, and then discharged therefrom onto the paper discharge tray 41 through the conveyer rollers 54.

In addition, when the copying apparatus is set to a mode for producing a plurality of two-sided copy papers, the transfer paper which has passed through the fixing device 37 is fed to the second paper feeding-in path 59 through the claws 38 and 39. Thereafter, the transfer paper is fed from the second paper feeding-in path 59 to the conveyer path 43 through the claw 40 and then discharged therefrom onto the paper discharge tray 41 in the state that the first side of the transfer paper is oriented downward.

On the other hand, when the transfer paper to be subjected to a two-sided copy paper producing process is a large-size paper such as a longitudinally postured transfer paper of A4-size (or LT-size) or a paper larger than the same, the paper feeding-in path 59 is used first in place of the first paper feeding-in path 58, after one side, i.e., a first side, of the transfer paper has been copied. In this case, the transfer paper is fed to the conveyer path 43 through the claws 38, 39 and 40, the transfer paper is then fed to the second paper feeding-in path 59 through the claw 40, on the basis of the detection of the transfer paper by means of the sensor 56.

In this case, when the transfer paper is of A3-size, only the gate claw 63 is moved to open the corresponding gate outlet between the release rollers 62 and the claw 63, so that the transfer paper can be discharged onto the tray 42a through the gate outlet between the release rollers 62 and the claw 63. Similarly, when the transfer paper is of B4-size, the transfer paper can be discharged onto the tray 42a through the gate outlet between the release rollers 66 and the claw 64. Further, when the transfer paper is a longitudinally postured paper of A4-size or B5-size, the transfer paper can be discharged onto the tray 42a through the gate outlet between the release rollers 67 and the claw 65.

The subsequent operation of the copying apparatus in the two-sided copy paper producing process for the large size transfer paper is the same as that for the above-mentioned transversely postured transfer paper of A4-size.

On the other hand, in the case that a synthetic or superimposed copy mode has been selected, the transfer paper is fed from the fixing device 37 to the second paper feeding-in path 59 through the gate claw 39 irrespective of the size of the transfer paper, after a first toner image has been fixed on a first side of the transfer paper.

Thereafter, when the transfer paper to be subjected to the the synthetic or superimposed copy paper producing process is a large-size paper, the transfer paper is discharged from the second paper feeding-in path 59 onto the tray 42a through one of the gate outlets, in the same manner as that for the large-size transfer paper to be subjected to the above-mentioned two-sided copy paper producing process. On the other hand, when the transfer paper to be copied with the synthetic or superimposed copy mode is a small-size paper such as a transversely postured paper of A4-size or a paper smaller than the same, all the gate claws 63 to 65 are maintained at their closed positions as denoted by the solid line in FIG. 2, so that the transfer paper can be discharged from the second paper feeding-in path 59 onto the tray 42a after passing over the claw 65. In this way, the transfer paper is laid on the tray 42a in the state that the first side thereof is oriented downward.

After that, the transfer paper on the tray 42a is fed to the drum 11 again, in order to transfer a second toner image from the drum surface to the first side of the transfer paper. The second toner image is then fixed on the transfer paper first side by the fixing device 37.

Next, explanation will be made as to the automatic document feeder 1 with reference to FIGS. 1 and 3.

Figure 3:
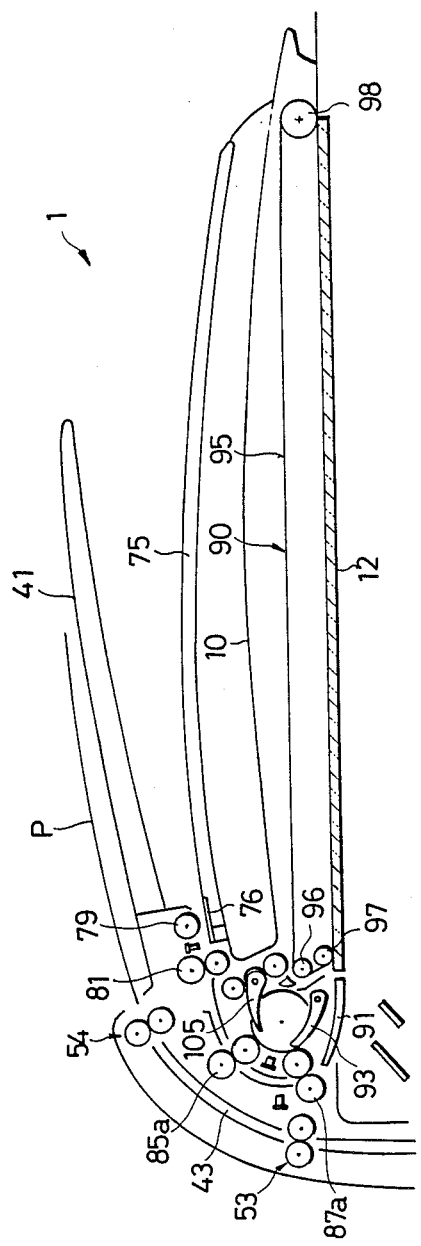
FIG. 3 is a schematic constitutional view of the whole of the automatic document feeder shown in FIG. 1.

Referring to FIGS. 1 and 3, the automatic document feeder 1 is constructed to perform automatic feeding of a plurality of documents D one by one from the first page. The automatic document feeder 1 comprises a feeding document tray 75 for stacking thereon a plurality of documents D. Although, the feeding document tray 75 in the illustrated embodiment is formed at its upper surface with a gentle convex, the feeding document tray 75 may be formed with a flat upper surface. The feeding document tray 75 is disposed below the paper discharge tray 41. Disposed below the feeding document tray 75 is a discharge document tray 10 for accommodating the documents which have been subjected to an optical exposure process.

As best shown in FIG. 1, a push plate 76 is pivotally attached at the right-hand end thereof to the left-hand end of the feeding document tray 75 and is pushed upward by means of a spring 77 which is disposed between the push plate 76 and the feeding document tray 75. Disposed above the push plate 76 is a document pick-up roller 79 for feeding the document D from the tray 75 in the direction of the arrow F shown in FIG. 1. The pick-up roller 79 is supported by an elevator (not shown) for rotation in the clockwise direction as denoted by the arrow C in FIG. 1, and for vertical movement between its upper and lower positions as denoted by the solid and imaginary lines in FIG. 1.

Disposed at the downstream side of the pick-up roller 79 in the document feeding direction are a document feed roller 81 and a separation roller 82 which are pushed to each other substantially in the vertical direction. The document feed roller 81 is rotatable in the clockwise direction in FIG. 1, while the separation roller 82 is rotatable in the clockwise direction as denoted by the arrow E in FIG. 1 as well as the counterclockwise direction.

A first document sensor 83 for detecting the document D fed from the tray 75 is disposed between the pick-up roller 79 and the document feed roller 81. Successively disposed at the downstream side of the document feed roller 81 in the document feeding direction are a pair of first stationary guide plates 86a and 86b, a pair of first conveyer rollers or pinch rollers 85a and 85b, a pair of second stationary guide plates 86c and 86d, and a pair of second conveyer rollers or pinch rollers 87a and 87b. The first and second stationary guide plates are curved to define a C-shaped document feeding path.

A second document sensor 88 for detecting a document D to be fed to the contact glass 12 is disposed at the upstream side of the rollers 87a and 87b, while a third stationary guide plate 89 for leading the document D toward the upper surface of the contact glass 12 is disposed at the downstream side of the rollers 87a and 87b. The third stationary guide plate 89 is curved along the C-shaped document feeding path. Also disposed at the downstream side of the rollers 87a and 87b is a first change-over claw 91 which is pivotally supported by a pivot pin 92. The upper surface of the change-over claw 91 is also curved along the C-shaped document feeding path. Disposed above the guide plate 89 is a second change-over claw 93 which is pivotally supported by a pivot pin 94. The second change-over claw 93 is also disposed in a document inlet portion of a document discharging path which will be described later in detail.

The first and second change-over claws 91 and 93 can be driven by actuators such as solenoids (not shown) so as to move between their open and closed positions as denoted by the solid and imaginary lines in FIG. 1, respectively.

Disposed above the upper surface of the contact glass 12 is a belt conveyer device 90 as a document conveying device which is able to convey the document D rightward up to a predetermined exposure position, as well as able to convey the same in the opposite direction. As shown in FIG. 3, the belt conveyer device 90 comprises an endless conveyer belt 95, a drive roller 96 which is driven by a drive source such as motor (not shown) for rotation in forward and backward directions, a guide roller 97 and a tension roller 98.

In order to ensure reliable conveyance of a document D along the upper surface of the contact glass 12, it is desirable that the belt 95 is made of material such as rubber having a sufficient coefficient of friction relative to a paper as a document.

Referring to FIG. 1, there is shown a main conveyer roller 99 which can be driven so as to rotate in forward and backward directions. The rollers 85b and 87b are in press contact with the outer periphery of the main roller 99, for holding a document D therebetween. As the main roller 99 rotates in a first or clockwise direction in FIG. 1, a document held between the main roller 99 and the rollers 87a and 85a can be fed to a first discharge path defined between upper and middle discharge rollers 101 and 102 for discharging the document D onto the tray 10. The upper and middle discharge rollers 101 and 102 are in press contact with each other.

Disposed below the roller 102 is a lower discharge roller 106 which is in press contact with the middle discharge roller 102 so as to define therebetween a second discharge path for discharging a document D onto the tray 10. The middle discharge roller 102 can be driven by a drive source such as motor (not shown) so as to rotate in forward and backward directions together with the upper and lower discharge rollers 101 and 106.

A third change-over claw 105 is pivotally supported by a pivot pin 105a which is disposed coaxially with the roller 102 and is adapted to be driven by an actuator such as solenoid so as to move between its first and second positions as denoted by the solid and imaginary lines in FIG. 1.

Disposed between the roller 106 and the second change-over claw 93 are stationary guide members 107 and 108. A document sensor 104 for detecting a document D fed from the contact glass 12 is disposed between the rollers 85b and 87b.

Figure 4:
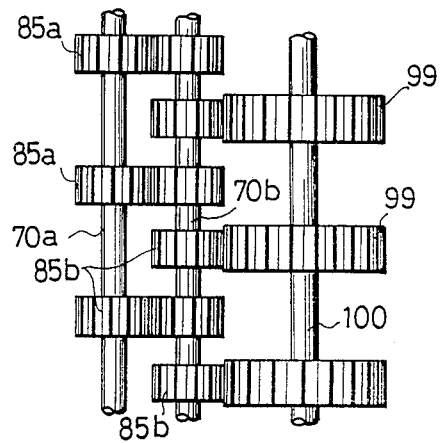
FIGS. 4 and 5 are plan views illustrating the arrangement of different conveyer rollers, respectively, for explaining the state of mutual press contacts of the conveyer rollers.
Figure 5:
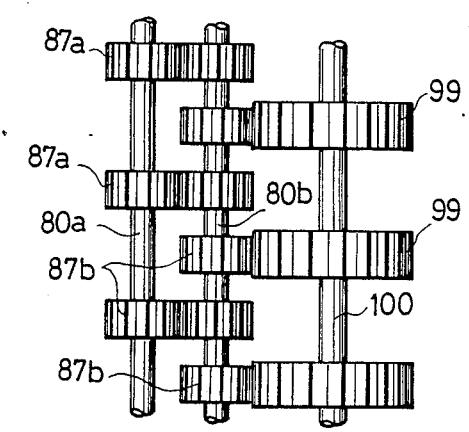

The arrangement of the rollers 85a, 85b, and 99, and the arrangement of the rollers 87a, 87b, and 99 are well shown in FIGS. 4, and 5, respectively.

Namely, in the particular embodiment shown in FIGS. 4 and 5, the rollers 85a, 85b, 87a, 87b, and 99 are comprised of a plurality of spaced roller components, in which the components of the rollers 85a, 87a, and 99 are fixed to drive shafts 70a, 80a, and 100, respectively, while the components of the rollers 85b and 87b are rotatably mounted on intermediate shafts 70b and 80b, respectively.

The arrangement of the components of the rollers 85a, 85b, and 99 are such that the components of the roller 85b are alternately in press contact with the components of the roller 85a and the components of the roller 99 in a staggered fashion. Similarly, the arrangement of the components of the rollers 87a1, 87b, and 99 are such that the components of the roller 87b are alternately in press contact with the components of the roller 87a and the components of the roller 99 in a staggered fashion.

The drive shaft 100 of the roller 99 can be driven by a drive source such as motor (not shown) in the foward and backward directions, while the drive shafts 70a and 80a of the roller 85a and 87a can be driven by drive source such as motor (not shown) in one direction. A common drive motor may be used for the rotation of the rollers 85a, 87a, 99a, and 102, in place of the above-mentioned individual drive sources.

Accordingly, in the particular embodiment shown in FIGS. 4 and 5, it is possible to rotate the rollers 85a and 87a irrespective of the direction of rotation of the roller 99.

Alternatively, the components of the rollers 85a and 99 may be arranged so as to be in press contact with the common components of the roller 85b. Similarly, the components of the rollers 87a and 99 may be arranged so as to be in press contact with the common components of the roller 87b.

Photosensors of light reflection type may used as the above-mentioned sensors 83, 88, and 104, for example.

In the above-described embodiment, the rollers 79, 81, and 82 together constitute a first section of a document feeding means for feeding the documents D one by one from the feeding document tray 75, while the guide plates 86a and 86b, as well as the rollers 85a, 85b, 87a, and 87b together constitute a second section of the document feeding means for receiving the document fed from the first section of document feeding means and for feeding the same toward the contact glass 12 as an optical exposure portion of the copying apparatus, while reversing the same upside down.

On the other hand, the rollers 85a, 87a, 101, 102, and 106 together constitute a reversing convey means for receiving the document fed from the document conveying means and which is capable of conveying the document toward the tray 10 while reversing the same upside down. The reversing convey means is also capable of conveying the document in the opposite direction toward the tray 10 while reversing again the same upside down. The reversing convey means further comprises a curved guide plate (not shown in the drawings for the sake of simplicity) which is disposed around the peripheral surface of the roller 99.

Further, in this embodiment, the second change-over claw 93 is movable between a first position at which it enables the document fed from the document conveying means to be led to the reversing convey means, and a second position at which it enables the document to be fed toward the tray 10 when the reversing convey means conveys the same in the opposite direction. Furthermore, in this embodiment, the third change-over claw 105 is movable so as to selectively lead the document fed through the reversing convey means toward the tray 10 or the optical exposure portion of the copying apparatus.

Next, explanation will be made as to the operation of the automatic document feeder 1 when a plurality of single-sided image bearing documents having successive pages are used for producing copies, with reference to FIGS. 6 to 9.

In this case, a plurality of documents (single-sided image bearing documents) D are stacked on the tray 75 in the state that the image bearing surfaces thereof are oriented upward, and that the uppermost document has the first page. In order to start the document feeding operation, it is necessary to insert the documents D up to a path between the rollers 81 and 82, as shown in FIG. 1. In the state that the documents D are not yet inserted, the push plate 76 is held by a latch means (not shown) at its lower position as denoted by the solid line in FIG. 9 against the pushing force of the spring 77. At this time, the pick-up roller 79 is located at its upper position as denoted by the solid line in FIG. 9.

As the documents D stacked on the tray 75 is inserted to the path between the rollers 81 and 82, the documents D are detected by the sensor 83, which causes the push plate 76 to be released from the latch means and thereby to move upward, as shown in FIG. 1. Then, the pick-up roller 79 is moved downward to abut on the uppermost document D, while rotating in the direction of the arrow C, as shown in FIG. 1, causing the uppermost document D to be fed to the left. When two or more overlapping documents D have been simultaneously picked up by the pick-up roller 79, the separation roller 82 serves to separate the uppermost document D from the remaining document(s) D, so that only the uppermost document D can be fed to the path between the rollers 85a and 85b.

When the document D has arrived at the path between the rollers 85a and 85b, the rollers 85a and 85b are maintained in the state of stopping, which serves to rectify a possible skew of the document D.

Immediately after the document D has abutted to the rollers 85a and 85b, the rollers 85a and 85b start rotating, and thus the document D is fed from the rollers 85a and 85b through a path between the guide plates 86a and 86b to the rollers 87a and 87b. The document D is further fed from the rollers 87a and 87b through the first change-over claw 91 toward the contact glass 12 on which the document D is feed to the right in FIG. 1 by means of the belt conveyer device 90 which is driven by the rotation of the roller 96 in the direction of the arrow G shown in FIG. 1.

The trailing edge of the document D can be detected by the sensor 88, and a stopping control for stopping the feeding of the document D is performed on the basis of the detection signal of the sensor 88. Namely, counting of pulses is started when the document trailing edge is detected by the sensor 88, and when the number of pulses counted reaches a predetermined number, the feeding of the document D is stopped, and thus the trailing edge of the document D is positioned at a predetermined scanning reference position for a scanning operation of the copying apparatus.

As mentioned above, in the particular embodiment, since the counting of pulses is started when the document trailing edge is detected by the sensor 88, it is possible to reduce the moving distance of the document D within the term between the detection of the document trailing edge by the sensor 88 and the arrival thereof at the above-mentioned scanning reference position. Accordingly, it is possible to control the stopping position of the document D at the scanning reference position with an increased accuracy.

As the document D is laid stationarily on the contact glass 12, an optical exposure process for the document D is performed by the scanning operation of the optical exposure system 20 in the direction of the arrow A shown in FIG. 2.

Figure 6:
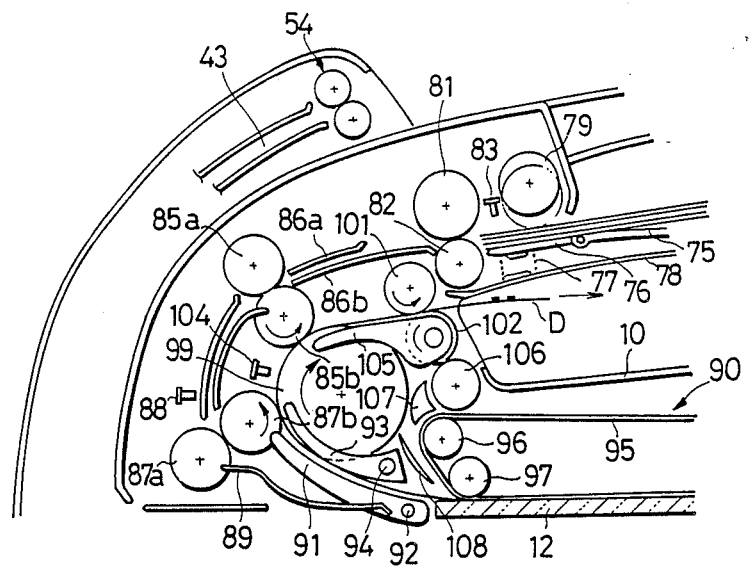
FIGS. 6 and 7 are schematic constitutional views similar to FIG. 1, each for explaining the operation of the automatic document feeder during a single-side copy mode.

After that, the roller 96 of the belt conveyer device 90 starts rotating in the direction opposite to the direction of the arrow G, and the first change-over claw 91 is moved to the position shown in FIG. 6. However, at this time, the second and third gate claws 93 and 105 are maintained as they are, as shown in FIG. 6. Further, the rollers 99 and 102 are driven to start rotating clockwise as denoted by the arrows in FIG. 6, respectively.

Therefore, as shown in FIG. 6, the document D is conveyed from the contact glass 12 along the outer periphery of the roller 99 toward the discharge document tray 10. However, when the leading edge of the document D is projected from the path between the rollers 101 and 102, the rollers 99 and 102 start rotating counterclockwise as denoted by the arrows in FIG. 7, on the basis of the detection of the document trailing edge by the sensor 104. At this time, the first and second change-over claws 91 and 93 move to the positions shown in FIG. 7, respectively.

Accordingly, the document D is fed back along the outer periphery toward the path between the rollers 102 and 106 and then discharged from the rollers 102 and 106 onto the tray 10 in the state that the image bearing surface (i.e., the first page) of the document D is oriented downward.

If the document D having a first page (i.e., the first page) is discharged from the rollers 101 and 102 in the state as shown in FIG. 6, the first document D will be stacked on the tray 10 in the state that the image bearing surface of the first document D is oriented downward. In such a case, the next document having a second page will be stacked on the image bearing surface (the first page) of the first document D. In this way, the documents D having successive pages will be inconveniently stacked on the tray 10 in the state that the order of pages of the documents D is opposite to that on the feeding document tray 75.

Figure 7:
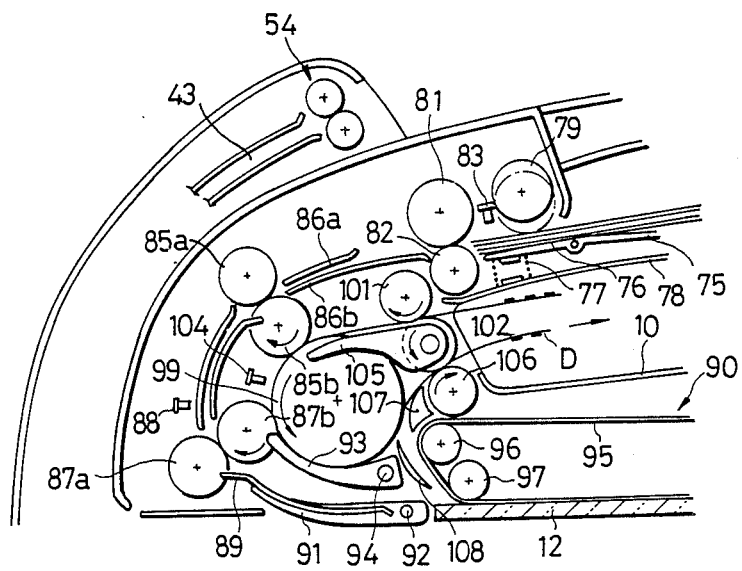

With respect to this, in the illustrated embodiment, since each document is discharged onto the tray 10 after being reversed upside down from the state shown in FIG. 6 to the state shown in FIG. 7 through the reversing convey means, all the documents D can be stacked on the tray 10 in the order of page in the state that the image bearing surfaces of the documents D are oriented downward. Accordingly, when the documents D are turned over all together after they have been taken out from the tray 10, the order of pages of the documents D becomes equal to that on the feeding document tray 75.

Next, explanation will be made as to the operation of the automatic document feeder 1 when a plurality of two-sided image bearing documents D having successive pages are used for producing copies.

In this case, the documents D are stacked on the tray 75 in the state that first or front surfaces of the documents D are oriented upward, and that the uppermost document D has the first gage at its first or front surface. The documents D is then inserted in the direction of the arrow F shown in FIG. 1, similarly to the above-mentioned single-sided image bearing documents.

The two-sided image bearing document D is fed from the tray 75 to the upper surface of the contact glass 12, and then an optical exposure process for the first or front surface of the document D is performed by the scanning operation of the optical exposure system 20 (FIG. 2), in the same manner as that for the single-sided image bearing document.

Figure 8:
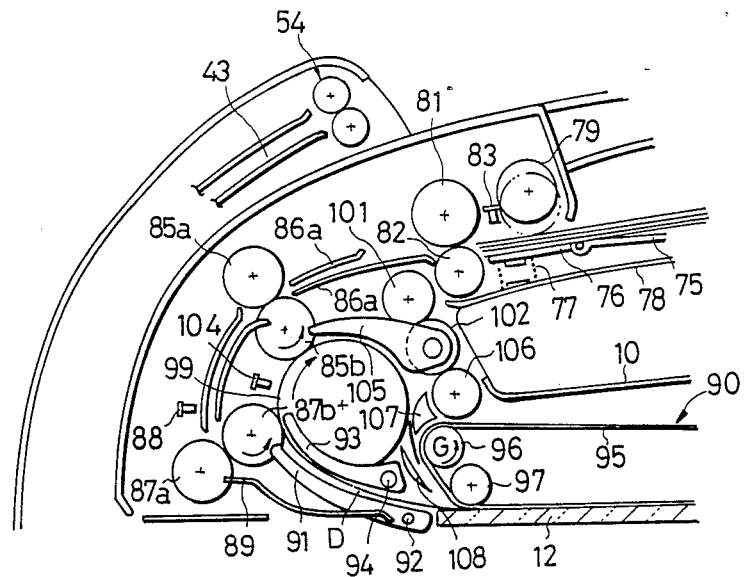
FIG. 8 is a schematic constitutional view similar to FIG. 1, for explaining the operation of the automatic document feeder during a duplex copy mode.
Figure 9:
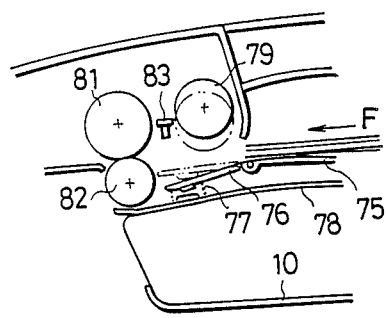
FIG. 9 is a schematic constitutional view for explaining the position of a push plate before originals or documents are inserted into the automatic document feeder.

After that, the roller 96 of the belt conveyer device 90 starts rotating in the direction opposite to the direction of the arrow G shown in FIG. 1, and the first change-over claw 91 is moved to the position shown in FIG. 8. At this time, although the second change-over claw 93 is maintained at the upper position as shown in FIG. 8, the third change-over claw 105 is moved counterclockwise from the position shown in FIG. 1 to the position shown FIG. 8. Further, at this time, although the roller 99 is driven to start rotating clockwise as denoted by the arrow in FIG. 8, the roller 102 is maintained at a stationary state.

Therefore, as shown in FIG. 8, the document D is conveyed from the contact glass 12 into the space between the first and second change-over claws 91 and 93. Then, the document D is further conveyed by the rollers 99, 87b and 85b toward the contact glass 12, while being guided by the under surface of the third change-over claw 105 and the guide members 107 and 108, and then conveyed by the belt conveyer device 90 again to the right in FIG. 8 along the upper surface of the contact glass 12. Namely, the document D is circulated by the reversing convey means while being reversed upside down, and then returns to the upper surface of the contact glass 12 in the state that its second or back surface is oriented downward. The document D is then stopped and the trailing edge thereof is positioned at the predetermined scanning reference position.

In this case, the trailing edge of the document D can be detected by the sensor 104, and a stopping control for stopping the feeding of the document D is performed on the basis of the detection signal of the sensor 104, in a manner which is similar to that for the above-mentioned single-sided image bearing document. Accordingly, also in this case, it is possible to reduce the moving distance of the document D within the term between the detection of the document trailing edge by the sensor 88 and the arrival thereof at the above-mentioned scanning reference position.

As the document D is laid stationarily on the contact glass 12, an optical exposure process for the second or back surface of the document D is performed by the scanning operation of the optical exposure system 20 (FIG. 2).

After that, the roller 96 of the belt conveyer device 90 starts rotating in the direction opposite to the direction of the arrow G shown in FIG. 8, and the third change-over claw 105 is moved counter-clockwise from the position shown in FIG. 8 to the position shown FIG. 6.

Accordingly, the document D is conveyed toward the rollers 101 and 102, while being reversed upside down, as shown in FIG. 6, and then discharged by the rollers 101 and 102 onto the tray 10 in the state that the first or front surface of the document D is oriented downward.

In this way, all the documents D can be stacked on the tray 10 in the order of page in the state that the first or front surfaces of the documents D are oriented downward. Accordingly, when the documents D are turned over all together after they have been taken out from the tray 10, the order of pages of the documents D becomes equal to that on the feeding document tray 75.

As mentioned above, in the automatic document feeder 1 according to the present invention, documents are copied one by one from the first page thereof. Accordingly, even when image bearing pages of an odd number of single-sided image bearing documents are copied on opposite sides of transfer papers for producing two-sided copy papers, it is ensured that a blank page is conveniently formed on the back side of a transfer paper which in turn is copied on the front side thereof with the last page of the documents. Accordingly, it is possible to prevent such a blank page from being formed on the back side of a first page copied, and it is unnecessary to count the number of single-sided image bearing documents before a copying process is started.

Further, in the illustrated embodiment, since the document feeding means, the reversing convey means, the first to third change-over claws 91, 93, and 105 together are concentrated on the side of the scanning reference position or on the left-hand side in FIG. 3. Accordingly, it is possible to reduce the time necessary for setting the document on the optical exposure portion of the copying apparatus. Further, when the automatic document feeder is pivotally attached to the copying apparatus main body 2 at the side of the optical exposure portion, it is possible to reduce force necessary for the pivotal movement of the automatic document feeder 1.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An automatic document feeder for an image forming apparatus having an optical exposure portion for performing thereon scanning of a document, comprising:
- first and second document trays each for stacking thereon one or more documents;
- a document feeding means for feeding the documents one by one from the first document tray in order from the uppermost one of the documents, while reversing the same upside down;
- a document conveying means for feeding a document in forward or backward directions along the optical exposure portion;
- a reversing convey means for receiving the document fed from the optical exposure portion and for feeding the same in a first direction toward the second document tray while reversing the same upside down, as well as a second direction opposite to the first direction;
- a first change-over means for selectively connecting the optical exposure portion to the document feeding means for the reversing convey means;
- a second change-over means movable between a first position at which the document fed from the optical exposure portion is led toward the reversing convey means, and a second position at which the document is led toward the second document tray when the document is fed by the reversing convey means in the second direction; and
- a third change-over means for selectively leading the document fed by the reversing convey means in the first direction to the second document tray or the optical exposure portion;
- when a two-sided image bearing document is copied, the first change-over means being adapted to connect the optical exposure portion to the reversing convey means, and the third change-over means being adapted to lead the document to the optical exposure portion while the reversing convey means is adapted to feed the document in the first direction, after that, the first change-over means being adapted to be maintained in the selecting position thereof, and the third change-over means adapted to lead the document to the second document tray while the reversing conveying means being adapted to be maintained in the feed direction of the document;
- when a single-sided image bearing document is copied, the first change-over means being adapted to connect the optical exposure portion to the reversing convey means, and the third change-over means being adapted to lead the document to the second document tray while the reversing convey means is adapted to feed the document in the first direction, after that, the second change-over means being adapted to move to the second position and the third change-over means being adapted to be maintained in the selecting position thereof while the reversing convey means is adapted to be changed in the feeding direction to the second direction.

2. An automatic document feeder means, the reversing convey means, and the first, second and third change-over means are disposed at one side of the optical exposure portion.

3. An automatic document feeder according to claim 1, wherein the reversing convey means comprises:
- a main conveyer roller which is drivable for rotation in forward and backward directions;
- a plurality of pinch rollers which are in press contact with the outer periphery of the main conveyer roller for holding the document therebetween, so that when the main conveyer roller is rotated in the forward and backward directions, the document held between the main and pinch rollers can be fed in the first and second directions, respectively;
- upper and lower discharge rollers; and
- a middle discharge roller disposed between the upper and lower discharge rollers in press contact therewith, the middle discharge roller being drivable for rotation in forward and backward directions together with the upper and lower discharge rollers, whereby defining a first discharge path between the upper and middle discharge rollers for discharging therefrom the document fed by the main and pinch rollers in the first direction toward the second document tray, as well as a second discharge path between the middle and lower discharge rollers for discharging therefrom the document fed by the main and pinch rollers in the second direction toward the second document tray.

4. An automatic document feeder according to claim 1, wherein the document feeding means and the reversing convey means are provided with document sensors, respectively, each of which detects the trailing edge of the document to be fed to the optical exposure portion and produces a detection signal which is used for stopping the document in place on the optical exposure portion.

5. An automatic document feeder according to claim 4, the detection signal of the document sensor provided at the reversing convey means is used for turning round of the reversing convey means from the first direction to the second direction.

6. An automatic document feeder according to claim 1, wherein the second document tray is disposed below the first document tray.

* * * * *

UNITED STATES PATENT AND TRADEMARK OFFICE
CERTIFICATE OF CORRECTION

PATENT NO. : 4,979,727

DATED : DECEMBER 25, 1990

INVENTOR(S) : TADAO KOIKE ET AL

It is certified that error appears in the above-identified patent and that said Letters Patent is hereby corrected as shown below:

COLUMN 18, LINE 7;

Claim 2, line 1, please change "feeder means," to --feeder according to claim 1, wherein the document feeding means,--.

Signed and Sealed this

Eighteenth Day of August, 1992

*Attest:*

DOUGLAS B. COMER

*Attesting Officer*   *Acting Commissioner of Patents and Trademarks*